United States Patent [19]

Miyahara et al.

[11] Patent Number: 6,103,306
[45] Date of Patent: Aug. 15, 2000

[54] SUPER-ANTIRUST COMPOSITION AND ANTIRUST TREATING METHODS

[75] Inventors: Kanekiyo Miyahara, Kogasaka Machida; Atsuhiro Takabatake, Tokyo; Yukiharu Yamaki, Odawara; Masakazu Ito; Osamu Seko, both of Hiratsuka, all of Japan

[73] Assignee: Mitsubishi Jidosha Kogyo Kabushiki Kaisha, Tokyo, Japan

[21] Appl. No.: 09/245,338

[22] Filed: Feb. 5, 1999

[30] Foreign Application Priority Data

Feb. 6, 1998 [JP] Japan ................................ 10-39829

[51] Int. Cl.$^7$ ..................................................... B05D 5/00
[52] U.S. Cl. ................... 427/287; 106/14.29; 106/14.33; 106/14.43; 106/14.44; 106/403; 106/417; 204/509; 427/385.5; 427/388.1; 427/435; 427/458

[58] Field of Search ................................ 427/385.5, 388.1, 427/289, 435, 458; 204/509; 106/14.29, 14.33, 14.43, 14.44, 403, 417

*Primary Examiner*—Bernard Pianalto
*Attorney, Agent, or Firm*—Arent Fox Kintner Plotkin & Kahn, PLLC

[57] ABSTRACT

Disclosed are a super-antirust coating used for a vehicle, which comprises 5 to 45% (by weight, hereinafter the same) of petroleum sulfonate and/or a metal salt thereof, 0.5 to 35% of lanolin fatty acid and/or a metal salt thereof, 0.5 to 35% of hardened castor oil, and 0.05 to 35% of a scaly filler and/or a fibrous filler, and an antirust treating method comprising coating a necessary site on a surface of an outer panel or a part of a vehicle with the super-antirust coating to a thickness of 50 μm to 200 μm, and drying the coating at 5 to 30° C. for 1 to 2 hours to form a reinforced antirust coating.

2 Claims, No Drawings

SUPER-ANTIRUST COMPOSITION AND ANTIRUST TREATING METHODS

FIELD OF THE INVENTION

The present invention relates to super-antirust coatings for preventing rust on vehicles, particularly on outer panels and parts of automobile bodies, and antirust treating methods using the same.

BACKGROUND OF THE INVENTION

In cold districts of Europe and America, and in areas of heavy snowfall of Hokuriku, Tohoku and Hokkaido districts of Japan, slip accidents of automobiles occur by the freezing of roads in winter, so that rock salt is scattered for preventing the freezing of roads by virtue of the action of its freezing-point depression. This is useful for preventing the freezing of roads. However, rock salt contains a large amount of sodium chloride. Accordingly, when passing automobiles send rock salt flying and it strikes their own automobiles, sodium chloride remains on outer panels of the automobiles to develop rust on steel panels thereof, which causes hole corrosion and structural corrosion in the end.

As a measure for solving this problem, vehicles, particularly outer panels and parts of automobiles, are coated with wax antirusts for preventing rust. These antirusts are ones mainly composed of microcrystalline wax or petrolatum oxide, with which various antirust additives and pigments are mixed. They, of course, cover surfaces of the steel panels, and penetrate joints between the steel panels to fill them, thereby protecting the steel panels from rust due to moisture entering such sites. Thus, they have a high antirust effect. However, for obtaining their penetrating performance, it is generally required that coatings formed are flexible, and the effect for preventing the coatings from chipping due to pebbles sent flying is insufficient. For this reason, methods have been employed in which phthalic acid alkyd resin coatings are first applied to form hard coatings, and then, wax antirusts are applied thereto. However, the wax antirusts are relatively weak against steam washing which is conducted for removing snow or mud adhered to bodies, so that they have the disadvantage that the repetition of steam washing results in a gradual reduction in antirust ability.

As an anti-chipping measure, outer panels of body floors and wheel houses are coated with vinyl chloride plastisols obtained by plasticizing polyvinyl chloride resins with appropriate plasitcizers and mixing fillers therewith, as under body coatings, and side sills, fenders, aprons and lower portions of doors of bodies are coated with one-part type polyurethane resin coatings or polyester resin coatings, as anti-chipping coatings. These coatings have both the flexibility and toughness, so that they have a considerable anti-chipping effect. However, the coatings themselves have no substantial antirust effect. Accordingly, they are effective for chipping of pebbles and grit, but insufficient as a measure for chipping of rock salt. Further, they have little penetration, so that it has been necessary to coat joints between the steel panels with the conventional wax antirusts, separately.

Japanese Unexamined Patent Publication No. Hei 6-299026 shows an approach for enhancing antirust ability of under coatings such as vinyl chloride plastisols. In this improvement, however, the antirust performance is basically added while maintaining the anti-chipping performance and shock-resistant performance, and the long-term antirust performance by the penetration into joints between the steel panels is not given.

Further, various antirust steel panels improved in antirust performance by placing a special resin between two steel panels are developed in various iron manufacturing companies. However, these steel panels have the disadvantage of being high in cost, compared with ordinary steel panels.

Summarizing these, in the present circumstances, wax antirusts and their improved type antirusts satisfying the anti-chipping performance and resistance to steam washing have not been found yet, whereas highly reliable antirust ability is not given to the under body coatings of the vinyl chloride plastisol family.

SUMMARY OF THE INVENTION

It is therefore an object of the present invention to provide antirust coatings having sufficient anti-chipping performance even in monolayer coatings, and the resistance to steam washing and antirust performance equal to or higher than that of the conventional wax antirusts, at the same time, and to provide antirust treating methods using the coatings.

Other objects and novel features of the invention will become apparent from the whole description of this specification.

MEANS TO SOLVE THE PROBLEMS

For attaining such objects, the present inventors have conducted intensive investigation. As a result, mainly aiming at the enhancement of the strength of coatings, materials which have hitherto been widely used, for example, microcrystalline wax and petrolatum oxide, are used as moderately as possible, and other antirusts and specific fillers are combined therewith, thus succeeding in developing super-antirust coatings and antirust treating methods using the coatings.

According to the present invention, there are provided a super-antirust coating used for a vehicle, which comprises 5 to 45% (by weight, hereinafter the same) of petroleum sulfonate and/or a metal salt thereof, 0.5 to 35% of lanolin fatty acid and/or a metal salt thereof, 0.5 to 35% of hardened castor oil, and 0.05 to 35% of a scaly filler and/or a fibrous filler; and an antirust treating method comprising coating a necessary site on a surface of an outer panel or a part of a vehicle, on which electrodeposition coating is conducted or not, with a super-antirust coating which comprises 5 to 45% (by weight, hereinafter the same) of petroleum sulfonate and/or a metal salt thereof, 0.5 to 35% of lanolin fatty acid and/or a metal salt thereof, 0.5 to 35% of hardened castor oil, and 0.05 to 35% of a scaly filler and/or a fibrous filler to a thickness of 50 $\mu$m to 200 $\mu$m, and drying the coating at 5 to 30° C. for 1 to 2 hours to form a reinforced antirust coating.

DESCRIPTION OF THE PREFERRED EMBODIMENTS

The present invention will be described below in detail.

In the super-antirust coating according to the present invention, three components of petroleum sulfonate and/or a metal salt thereof, lanolin fatty acid and/or a metal salt, and hardened castor oil form a hard and strong coating, and exhibit antirust ability against metals at the same time.

Although petroleum sulfonate can be used as such, metal salts thereof are more preferred. Salts of alkali metals and alkaline earth metals are preferred. Examples thereof include the sodium salt and the calcium salt. The amount mixed is from 5 to 45%, and more preferably from 20 to 35%. Less than 5% leads to the possibility of failure to form a coating having sufficient strength, whereas exceeding 45% results in the inconvenience that the workability in coating is deteriorated. The petroleum sulfonate and the metal salts thereof can be used either alone or as a combination of two or more of them.

Similarly, lanolin fatty acid can be used as such, but metal salts thereof are more preferred. Salts of alkali metals and alkaline earth metals are preferred. Examples thereof include the sodium salt and the calcium salt. The amount mixed is from 0.5 to 35%, and more preferably from 10 to 25%. Less than 0.5% leads to the possibility of a reduction in antirust ability, whereas exceeding 35% results in the inconvenience that the workability in coating is deteriorated. The lanolin fatty acid and the metal salts thereof can be used either alone or as a combination of two or more of them.

Hardened castor oil is also an antirust additive, and forms a strong coating at the same time. This is also called hydroxystearic acid polyglyceride, and has a melting point of 84° C. Accordingly, this is a solid at ordinary temperature. The amount mixed is from 0.5 to 35%, and more preferably from 10 to 25%. Less than 0.5% leads to the possibility of a reduction in antirust ability, whereas exceeding 35% results in the inconvenience that the dispersibility in the coating is deteriorated.

The scaly filler and/or the fibrous filler can enhance the antirust effect according to the configuration characteristics of particles thereof. That is to say, a protective coating has hitherto been generally difficult to adhere to edge portions of a steel panel, and the thickness of the coating also becomes very thin. Rust is therefore easily developed. However, the filler can cover the edge portions to enhance the antirust effect. In addition, the scaly filler and/or the fibrous filler is laminated in the layer form in the coating, which allows the anti-chipping performance of the antirust coating to be enhanced. Examples of the scaly fillers include metal powders such as aluminum powder, and mica. The fibrous fillers include, for example, fibrous crystalline pigments such as needle-like calcium metasilicate, glass fiber and mineral fiber. For example, when aluminum powder is used, the antirust performance of the coating is improved by the sacrificial anode effect. The amount of the scaly filler and/or the fibrous filler formulated is from 0.05 to 35%, and more preferably from 0.1 to 5%. If the amount is less than 0.05%, sufficient enhancement of the antirust coating can not be expected, and there is the danger of failing to obtain required weather resistance when a weather resistance-required site such as a roof is coated with this coating. Exceeding 35% results in the possibility of deterioration of the dispersibility in the antirust coating and the coating workability. Of the abovementioned fillers, some slightly dispersible ones such as aluminum powder have previously been dispersed in appropriate resins to make products in the paste form. Such products may be used.

In addition to the above-mentioned compounding ingredients, it is also possible to add additives known in the art as antirust additives. Such additives include, for example, barium sulfonate, petrolatum oxide and metal salts thereof, waxy materials, microcrystalline wax, and synthetic sulfonic acids and metal salts thereof. However, when the antirust coatings are decreased in strength to become too soft by adding these additives in large amounts, the objects of the present invention are not attained. It is therefore preferred that the amounts thereof are limited to less than 10% of the whole compounding ingredients. Further, the addition of a synthetic resin selected from acrylic resins, phthalic acid alkyd resins and epoxy-modified alkyd resins can contribute to an improvement in the strength of the coating. It is therefore also possible to add these resins in appropriate amounts if necessary.

For enhancing the antirust ability, antirust pigments are preferably added to the antirust coatings of the present invention. Examples of the antirust pigments include red iron oxide, zinc dust and zinc phosphate. However, other antirust pigments known in the art can be used. The amount thereof added is suitably from 1 to 10% by weight. Further, for strengthening the coatings, various extender pigments such as calcium carbonate and barium sulfate may be added. Furthermore, it is possible to add color pigments such as carbon black and titanium oxide in appropriate amounts to pigment the coatings to any colors as required. In addition, the coatings can be diluted with aliphatic solvents to adjust them to appropriate viscosity, thereby improving the coating workability. The antirust coatings of the present invention can be produced by use of conventional mixing-dispersing devices or stirrers.

The super-antirust coatings according to the present invention are applied to vehicle, particularly to outer panels of floors, frames and other various parts attached outside, with conventional coating devices such as airless sprays, air sprays, air assist airless sprays and electrostatic coaters to form the coatings having an average thickness of 50 $\mu$m to 200 $\mu$m, followed by drying at 5 to 30° C. for 1 to 2 hours, whereby the antirust coatings excellent in performance can be obtained. A coating thickness of less than 50 $\mu$m leads to the possibility of failure to obtain sufficient antirust ability and anti-chipping performance. On the other hand, if the coatings are formed to a thickness exceeding 200 $\mu$m, there is the danger of failing to obtain uniform antirust coatings by the inconvenience of sagging or the like. The coatings can be dried preferably for about 1 hour, if the drying temperature is an ordinary temperature of about 20° C. However, the drying temperature too high or too low may prolong the drying time.

For better understanding of the present invention, examples will be described below. Needless to say, the present invention is not limited by the following examples.

EXAMPLE 1

Twenty percent (by weight, hereinafter the same) of the calcium salt of petroleum sulfonate, 10% of the calcium salt of lanolin fatty acid, 10% of hardened castor oil, 3% of zinc dust, 1% of carbon black, 0.5% of scaly aluminum powder and 55.5% of mineral spirit were mixed and dispersed to obtain super-antirust coating 1.

EXAMPLE 2

Thirty-five percent of the calcium salt of petroleum sulfonate, 10% of the calcium salt of lanolin fatty acid, 10% of hardened castor oil, 3% of zinc dust, 1% of carbon black, 0.5% of scaly aluminum powder and 40.5% of mineral spirit were mixed and dispersed to obtain super-antirust coating 2.

EXAMPLE 3

Twenty-five percent of the calcium salt of petroleum sulfonate, 10% of the calcium salt of lanolin fatty acid, 15% of hardened castor oil, 3% of zinc dust, 1% of carbon black, 0.5% of scaly aluminum powder and 45.5% of mineral spirit were mixed and dispersed to obtain super-antirust coating 3.

EXAMPLE 4

Twenty-five percent of the calcium salt of petroleum sulfonate, 25% of the calcium salt of lanolin fatty acid, 15% of hardened castor oil, 3% of zinc dust, 1% of carbon black, 0.5% of scaly aluminum powder and 30.5% of mineral spirit were mixed and dispersed to obtain super-antirust coating 4.

EXAMPLE 5

Twenty-five percent of the calcium salt of petroleum sulfonate, 15% of the calcium salt of lanolin fatty acid, 10% of hardened castor oil, 3% of zinc dust, 1% of carbon black, 0.5% of scaly aluminum powder and 45.5% of mineral spirit were mixed and dispersed to obtain super-antirust coating 5.

EXAMPLE 6

Twenty-five percent of the calcium salt of petroleum sulfonate, 15% of the calcium salt of lanolin fatty acid, 25% of hardened castor oil, 3% of zinc dust, 1% of carbon black, 0.5% of scaly aluminum powder and 30.5% of mineral spirit were mixed and dispersed to obtain super-antirust coating 6.

EXAMPLE 7

Twenty-five percent of the calcium salt of petroleum sulfonate, 15% of the calcium salt of lanolin fatty acid, 15% of hardened castor oil, 3% of zinc dust, 1% of carbon black, 0.1% of scaly aluminum powder and 40.9% of mineral spirit were mixed and dispersed to obtain super-antirust coating 7.

EXAMPLE 8

Twenty-five percent of the calcium salt of petroleum sulfonate, 15% of the calcium salt of lanolin fatty acid, 15% of hardened castor oil, 3% of zinc dust, 1% of carbon black, 1% of scaly aluminum powder and 40% of mineral spirit were mixed and dispersed to obtain super-antirust coating 8.

EXAMPLE 9

Twenty percent of the calcium salt of petroleum sulfonate, 10% of the calcium salt of lanolin fatty acid, 10% of hardened castor oil, 3% of zinc dust, 1% of carbon black, 5% of scaly aluminum powder and 51% of mineral spirit were mixed and dispersed to obtain super-antirust coating 9.

COMPARATIVE EXAMPLE

Forty percent of microcrystalline wax, 20% of the calcium salt of petrolatum oxide, 5% of the calcium salt of petroleum sulfonate and 35% of mineral spirit were mixed and dispersed to obtain antirust wax 1.

TEST METHODS (1) Preparation of Test Samples

Test panels in which electrodeposition coatings having an average thickness of 40 $\mu$m are formed on automobile steel panels having a size of 70×150 mm and a thickness of 0.8 mm by cationic electrodeposition were each coated with super-antirust coatings 1 to 8 by an airless spray coating device, followed by drying at 20° C. for 1 hour to obtain antirust coatings 1 to 9 having an average thickness of 100 $\mu$m.

On the other hand, the above-mentioned test panel was coated with a chassis black coating comprising a phthalic acid alkyd resin by an airless spray coating device to obtain a coating having a thickness of 30 $\mu$m. This operation was repeated to obtain a coating of the chassis black coating having an average thickness of 30 $\mu$m×2. Antirust wax 1 was applied onto this coating by an airless spray coating device, and dried at 20° C. for 1 hour to obtain a wax coating having an average thickness of 90 $\mu$m.

(2) Antirust Test

A cross cut was made on each of antirust coatings 1 to 9 and the wax coating of the test samples by a cutter knife, and each sample was placed in a salt spray tester. After the test for 1000 hours, each sample was taken out of the tester, and the rust developing state was examined for each sample.

(3) Anti-chipping Test

The test samples having antirust coatings 1 to 9 and the wax coating, respectively, were placed in an environmental test chamber set at −30° C., and 500 g of crushed stone No. 5 was allowed to collide against each of antirust coatings 1 to 9 and the wax coating at a pressure of 5 kgf/cm$^2$ at an angle of 90 degrees by a gravel tester installed in this chamber. Then, the separation state of each of the antirust coatings and the wax coating was observed.

Results

In the antirust test, rust was scarcely developed in all the test samples having antirust coatings 1 to 9 and the wax coating, and the width of the rust was a maximum of 0.4 mm.

On the other hand, in the anti-chipping test, no flaws reaching the bases were observed for antirust coatings 1 to 9 and the wax coating. For the wax coating, however, although no flaw reaching the base was not observed, the separation area was about twice that of antirust coatings 1 to 9.

According to the super-antirust coatings and antirust treating methods of the present invention, not only coating for supplementing antirust wax such as chassis black coating, which was conventionally necessary, becomes unnecessary, because of having the anti-chipping performance and the antirust performance to the outer panels and parts including joints between the steel panels at the same time, but also the anti-chipping performance in cold districts is significantly improved. In particular, the antirust ability of the edge portions, which has previously been a weak point in respect to rust prevention, can be remarkably improved. Further, at welded portions of the steel panels, hydrogen embrittlement occurs with high-temperature hydrogen gas, which raises a problem with regard to rust prevention. However, according to the super-antirust coatings and antirust treating methods of the present invention, the rust prevention of the welded portions becomes possible.

Furthermore, the antirust coatings obtained by the present invention are also excellent in the resistance to steam washing, so that the antirust ability can be maintained for a long period of time. In addition, they are excellent in recoating properties on previously applied coatings such as phthalic acid resin coatings, so that they can be recoated on antirust coatings as required. It is therefore possible to enhance the antirust performance and the anti-chipping performance depending on the sites. The coatings according to the present invention are also excellent in weather resistance by addition of various fillers. It is therefore also possible to apply them onto the roofs. They are extremely effective as an antirust measure for vehicles used in the harsh environment, for example, snowplows and track-clearing vehicles used in cold districts.

What is claimed is:

1. A super-antirust coating composition used for a vehicle, which comprises 5 to 45% (by weight, hereinafter the same) of petroleum sulfonate and/or a metal salt thereof, 0.5 to 35% of lanolin fatty acid and/or a metal salt thereof, 0.5 to 35% of hardened castor oil, and 0.05 to 35% of a scaly filler and/or a fibrous filler.

2. An antirust treating method comprising coating a necessary site on a surface of an outer panel or a part of a vehicle, on which electrodeposition coating is conducted or not, with a super-antirust coating which comprises 5 to 45% (by weight, hereinafter the same) of petroleum sulfonate and/or a metal salt thereof, 0.5 to 35% of lanolin fatty acid and/or a metal salt thereof, 0.5 to 35% of hardened castor oil, and 0.05 to 35% of a scaly filler and/or a fibrous filler to a thickness of 50 $\mu$m to 200 $\mu$m, and drying the coating at 5 to 30° C. for 1 to 2 hours to form a reinforced antirust coating.

* * * * *

UNITED STATES PATENT AND TRADEMARK OFFICE
CERTIFICATE OF CORRECTION

PATENT NO. : 6,103,306
DATED : August 15, 2000
INVENTOR(S) : K. Miyahara et al.

It is certified that error appears in the above-identified patent and that said Letters Patent is hereby corrected as shown below:

<u>Title page,</u>
Item [73], after "Mitsubishi Jidosha Kogyo Kabushiki Kaisha, Tokyo, Japan" add -- Nihon Tokushu Toryo Co., Ltd., Tokyo, Japan --

Signed and Sealed this

Sixth Day of November, 2001

*Attest:*

NICHOLAS P. GODICI
*Attesting Officer*     *Acting Director of the United States Patent and Trademark Office*